Oct. 24, 1961  D. A. CHRISTENSEN  3,005,648

DUAL LIP SEAL

Filed March 19, 1958

United States Patent Office 3,005,648
Patented Oct. 24, 1961

3,005,648
DUAL LIP SEAL
Dan A. Christensen, Menlo Park, Calif., assignor to Federal-Mogul-Bower Bearings, Inc., Detroit, Mich., a corporation of Michigan
Filed Mar. 19, 1958, Ser. No. 722,609
3 Claims. (Cl. 288—3)

This invention relates to an improved dual-lip fluid seal, particularly adapted for retaining lubricant in the space between a bore and a rotating shaft and for preventing dirt, mud, and other foreign matter from contaminating the lubricant.

The seal of the present invention possesses unusual advantages in the ease of its installation and sureness of its sealing, both these advantages stemming from a new structure and configuration. The invention also solves the problem of providing a satisfactory dual lip seal without having to rely on a garter spring or the like to force the lubricant-sealing lip into sealing engagement with the shaft. In this invention, such sealing engagement is brought about purely by the resilience and configuration of the sealing element itself, and no spring of any kind is needed or used. Moreover, the seal of this invention is well able to accommodate shaft eccentricity or runout and still provide a seal.

The new structure involves certain angles between the lips, an unusual tapering of the dust-sealing lip, and an equally unusual flaring of the lubricant-sealing lip. By these special relationships, a unique co-action of parts is obtained giving greatly improved results.

Other objects and advantages will appear from the course of the following description of a preferred embodiment thereof.

Figure 1:
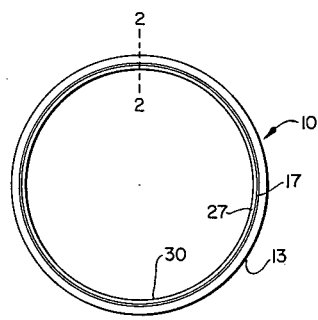
FIG. 1 is a view in front elevation of a seal embodying the principles of the present invention.

The seal 10 of the present invention has an outer metal case 11 provided with a cylindrical portion 12 whose outer peripheral wall 13 is adapted to fit into a bore 14 of a housing 15 or other member. A radially inwardly extending flange 16 of the case 11 ends in a terminal portion 17, preferably extending at an angle of approximately 45 degrees to the radial plane. To this terminal portion 17 may be secured an elastomeric sealing element 20, employing the structure described in application Serial No. 639,276, filed February 11, 1957, by Robert N. Haynie. However, the particular attachment of the sealing element 20 to the case 11 is not of vital significance in this invention, and other means may be employed, though the one shown is preferred because of its economy in materials and its secureness. In the structure shown in the drawings, the sealing element 20 includes an attachment portion 21 bonded to the full outer face 22 of the terminal portion 17, as well as to its end edge 23 and part only of its inner face 24.

An important feature of the seal 20 is a neck portion 25, comprising a thin annular radially extending portion joining the much thicker attachment portion 21 to a radially inner, thickened body portion 26, from which extend two sealing lips 27 and 28. The neck 25 acts as a flexing portion, and its operation is fully described later.

Figure 3:
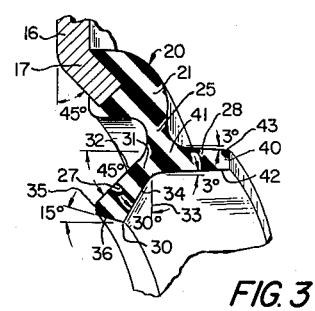
FIG. 3 is a still further enlarged fragmentary view of a portion of the seal of FIG. 2 showing the preferable angles employed.
Figure 2:
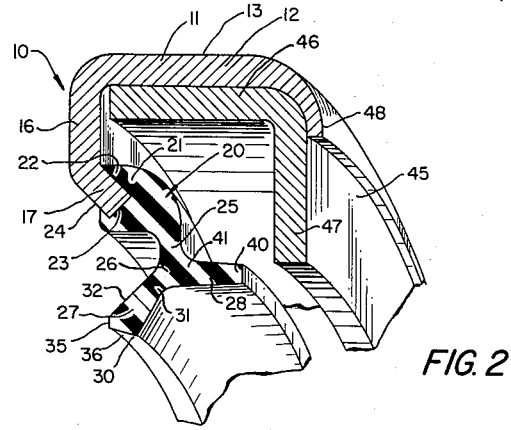
FIG. 2 is a greatly enlarged fragmentary view in perspective and in cross-section along the line 2—2 in FIG. 1.

The lubricant sealing lip 27 extends in radially and axially at an angle to the radial plane of the neck 25. Preferably, it is flared so that it is thicker at its inner peripheral portion 30 than at its radially outer junction 31 with the thickened portion 26. To be specific, the outer face 32 of the lip 27 preferably extends at an angle of approximately 45° to the radial plane 33 of the neck 25 and to the axis of the bore (see FIG. 3), while its inner face 34 preferably extends at an angle of approximately 30° to the same radial plane 33, so there is a divergence of about 15° between the faces 32 and 34. At its inner periphery 30, the lip 27 may be trimmed to provide a short radial face 35 and a generally axially extending face 36 which preferably extends at an angle of about 15° to the axis of the bore 13. The fact that the peripheral portion 30 is thicker than its inner portion 31 gives the lip 27 resiliency and gives it a body that tends to hold it in firm contact with a shaft 37 when expanded therearound, and assures its sealing action.

On the other hand, the dust sealing lip 28 extends axially out from the body 26 in the opposite axial direction from the lip 27, and it is tapered in the opposite way so that its outer extremity 40 is thinner than its attachment 41 to the body portion 26. This taper may be by having its inner face 42 and its outer face 43 converge toward the extremity 40 at an angle of approximately 3° each to the axis of the bore 13. The thickness of the attachment portion assures that the lip 28 will be swung into engagement with the shaft, for it flexes much less than the neck 25.

Figure 4:
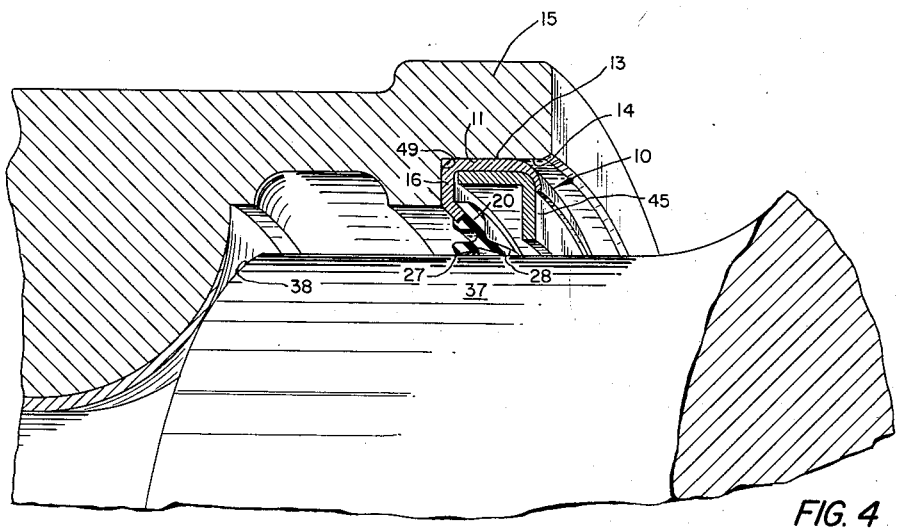
FIG. 4 is a fragmentary view in perspective and in section of the upper part of an installation incorporating the seal of this invention.

When the seal of this invention is installed (FIG. 4), it is placed on a shaft 37 having a larger diameter than the radially inner extremity 30 of the oil sealing lip 27 and a smaller diameter than the dust sealing lip 28. The end 38 of the shaft 37, therefore, first engages the oil sealing lip 27 and pushes it outwardly, the element 20 flexing at neck 25 to permit this and therefore swinging the dust-sealing lip 28 into contact with the shaft 37. The enlarged portion 30 acts as a type of compressive force which without a separate metal spring holds the lip 27 tightly around the shaft. The inward swinging of the lip 28 tends to exert compressive forces that tend to thicken the end 40, but these forces are not disruptive, because the then radially inner portion 40 of that lip 28 is initially much thinner because of the tapering; so there is not that bunching of material which would tend to make the dust-sealing lip 28 relatively inflexible and would therefore tend toward its deformation and would cause it to admit dust or other foreign matter. Thus, this invention, by proportioning of the two lips 27 and 28 so that the dust lip 28 which swings inwardly is tapered to the narrow extremity 40 while the lubricant lip 27 which is cocked outwardly is flared to the wider end 30, makes the seal follow out-of-flat portions or eccentricity in the rotating shaft 37 without becoming damaged.

As shown, in an installation, there is preferably an inner case 45 with a cylindrical portion 46 snugly engaging the cylindrical wall 12 of the case 11 and a radial flange 47 protecting the sealing element 20. The inner case 45 may be held by the turned-over end 48 of the outer case 11. Also, the radial wall 16 of the case 11 may engage a radial wall 49 in the installation.

When there is shaft eccentricity or runout, the neck 25 acts somewhat like a bellows, while the lips 27 and 28 spread out or tend to straighten out as needed.

To those skilled in the art to which this invention relates, many additional changes in construction and widely differing embodiments of the invention will suggest themselves without departing from the spirit and scope of the invention as defined in the claims.

What is claimed is:

1. A dual-lip radial rotary shaft seal comprising a rigid annular case and an elastomeric sealing member supported by said case, said sealing member having a radially extending flexing neck and a pair of sealing lips extending from said neck, one said sealing lip extending generally axially with faces converging toward each other away from said neck, so that said lip is narrower at its outer extremity than at its attachment to the neck; the other lip extending at an angle in the opposite axial direction and radially away from said case and having faces diverging from each other with its terminating edge wall at an included acute angle to the shaft axis and facing in said opposite direction, so that when said seal is installed said other lip is engaged by an axial insertion of a shaft and the lips are swung about said neck bringing both lips into axial alignment but extending in opposite axial directions.

2. A dual-lip radial shaft seal for interposition between a bore and a relatively rotating shaft and following said shaft when there is eccentricity or runout, comprising a rigid annular case adapted for insertion in the bore and an elastomeric sealing member supported by said case, said sealing member having a radially inwardly extending portion providing a flexing neck and a pair of sealing lips extending from said neck, one a dust-sealing lip extending generally axially with converging faces, the other a lubricant-sealing lip extending in the opposite axial direction and radially inwardly with diverging faces and having a terminating edge wall at an included acute angle to the shaft axis facing in said opposite direction, so that when said seal is installed around a shaft of larger diameter than said lubricant-sealing lip and of smaller diameter than said dust-sealing lip, the lips are swung about said neck by axial insertion of a shaft, bringing both lips into contact with the shaft with the lips facing in opposite axial directions, said dust-sealing lip having a small contact portion permitting accumulation of rubber as a result of the inward flexing, while said lubricant-sealing lip has pressure thereon exerted by its relatively large body of rubber being extended outwardly, said pressure serving to hold said lubricant-sealing lip in contact with the shaft.

3. A dual-lip fluid seal for interposition between a bore and a relatively rotating shaft comprising a rigid annular metal case adapted to seal in the bore and an elastomeric sealing member secured to and reinforced by said metal case, said sealing member having a radially inwardly extending portion providing a flexing neck terminating in a body at its radially inner portion and a pair of sealing lips extending away from said body, one lip being a dust-sealing lip extending generally axially with both a radially inner face and a radially outer face tapered at an angle of approximately 3° each to the axis and converging toward each other so that said dust-sealing lip is narrower at its outer extremity than at its attachment to the body so that it terminates radially inwardly at an angle greater than 90°; the other lip being a lubricant-sealing lip extending in the opposite axial direction and radially inwardly, with a radially outer face extending approximately 45° to the radial plane and a radially inner face extending approximately 30° to the radial plane, so that the outer portion of said lubricant-sealing lip is wider than at its attachment to the body and terminates radially inwardly in an included angle greater than 90°, so that when the seal is installed around a shaft of larger diameter than said lubricant-sealing lip and of smaller diameter than said dust-sealing lip by moving said shaft axially into said seal, the lips are swung about said neck bringing both lips into contact with the shaft with the lips facing in opposite axial directions, the narrow end of said dust-sealing lip enabling accumulation of rubber there when it is flexed inwardly, while the relatively large body of rubber at the outer end of the lubricant-sealing lip being extended outwardly generates pressure to hold it in close sealing contact with the shaft.

References Cited in the file of this patent

UNITED STATES PATENTS

| | | |
|---|---|---|
| 2,149,147 | Peterson et al. | Feb. 28, 1939 |
| 2,172,325 | Victor et al. | Sept. 5, 1939 |
| 2,235,735 | Bernstein | Mar. 18, 1941 |
| 2,809,853 | Nathan | Oct. 15, 1957 |

FOREIGN PATENTS

| | | |
|---|---|---|
| 700,811 | Great Britain | of 1953 |